United States Patent
Bui et al.

(10) Patent No.: US 8,004,789 B2
(45) Date of Patent: Aug. 23, 2011

(54) DETECTION AND ACQUISITION OF A SERVO PATTERN SUBJECT TO LATERAL MOTION

(75) Inventors: Nhan Xuan Bui, Tucson, AZ (US); Reed Alan Hancock, Tucson, AZ (US); Kevin Bruce Judd, Tucson, AZ (US); Kazuhiro Tsuruta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/630,087

(22) Filed: Dec. 3, 2009

(65) Prior Publication Data

US 2011/0134556 A1 Jun. 9, 2011

(51) Int. Cl.
*G11B 5/584* (2006.01)
(52) U.S. Cl. .................................... 360/77.12
(58) Field of Classification Search .................. None
See application file for complete search history.

(56) References Cited

U.S. PATENT DOCUMENTS

| | | | | |
|---|---|---|---|---|
| 5,946,159 A * | 8/1999 | Chliwnyj et al. | .......... | 360/77.12 |
| 6,031,673 A * | 2/2000 | Fasen et al. | ............. | 360/53 |
| 6,580,581 B1 * | 6/2003 | Bui et al. | ............. | 360/78.02 |
| 6,940,682 B2 * | 9/2005 | Bui et al. | ............. | 360/77.12 |
| 7,280,307 B2 | 10/2007 | Bui et al. | ............. | 360/75 |
| 7,342,738 B1 * | 3/2008 | Anderson et al. | .......... | 360/77.12 |
| 7,529,061 B2 * | 5/2009 | Bui et al. | ............. | 360/77.12 |
| 7,724,466 B2 * | 5/2010 | Bui et al. | ............. | 360/77.12 |
| 7,764,460 B2 * | 7/2010 | Bates et al. | ............. | 360/77.12 |
| 2006/0256465 A1 | 11/2006 | Biskeborn | | |
| 2007/0188910 A1 | 8/2007 | Bui et al. | | |
| 2007/0285845 A1 | 12/2007 | Nayak et al. | | |
| 2009/0141405 A1 | 6/2009 | Vanderheyden | | |

OTHER PUBLICATIONS

TUC090001, PCT International Search Report and Written Opinion, (International Application No. PCT/EP2010/066570), Jan. 27, 2011.

* cited by examiner

*Primary Examiner* — K. Wong

(57) ABSTRACT

A method, a servo system and a tape drive are provided to acquire lock on a servo signal. The servo signals of at least one servo element are monitored to detect a valid servo signal. If a valid servo signal is not detected than the fine actuator is moved in a first direction until either a valid servo signal is detected or the fine actuator travel limit is reached. When a valid servo signal is detected, the fine actuator is set to a neutral position and the coarse actuator is moved in the first direction. When the fine actuator travel limit is reached the fine actuator is moved to the first position and the coarse actuator is moved in a second direction, opposite of the first direction.

22 Claims, 3 Drawing Sheets

DETECTION AND ACQUISITION OF A SERVO PATTERN SUBJECT TO LATERAL MOTION

TECHNICAL FIELD

The invention relates to servo systems for laterally positioning data heads with respect to magnetic tape, and, more particularly, to detecting and acquiring a track following servo pattern recorded on the magnetic tape.

BACKGROUND

Magnetic tape provides a means for physically storing data which may be archived or which may be stored in storage shelves of automated data storage libraries and accessed when required. One method for maximizing the amount of data that can be stored is to maximize the number of parallel tracks on the media, and this is typically accomplished by employing servo systems which provide track following and allow the tracks to be spaced very closely.

Track following servo systems for magnetic tape data storage typically comprise a track following servo pattern of prerecorded servo tracks to allow precise positioning of a tape head which has servo elements, with respect to the servo tracks. The tape head includes one or more read/write elements precisely positioned with respect to the servo elements and which trace data tracks, parallel to the servo tracks. Specifically, servo elements mounted on the tape head read the servo pattern and feed the servo signals into a servo control loop.

SUMMARY OF THE INVENTION

The problem of lateral movement becomes greater as tape moves to even higher track densities. This is because as the tracks become smaller and closer together and the chance of misalignment increases. Therefore, there is an ongoing need for improved tape positioning systems to quickly acquire lock on the servo signal and provide precise stability and tracking of the tape relative to the tape head during operation.

Accordingly, embodiments of the present disclosure provide methods, servo systems, and tape drives, utilizing the fine actuator in acquiring lock on a servo signal. In one embodiment, the fine actuator is set to a first position. In one embodiment the first position is the neutral position with respect to the coarse actuator. The servo signals of at least one servo element are monitored to detect a valid servo signal. If a valid servo signal is not detected than the fine actuator is moved in a first direction until either a valid servo signal is detected or the fine actuator travel limit is reached.

In one embodiment, when a valid servo signal is detected, the fine actuator is set to the first position and the coarse actuator is moved in the first direction. Further, in one embodiment, when the fine actuator travel limit is reached the fine actuator is moved to the first position and the coarse actuator is moved in a second direction, opposite of the first direction.

DETAILED DESCRIPTION OF THE PREFERRED EMBODIMENT

In high track density tape storage devices, a compound actuator may be used in a track following system. The compound actuator typically includes a coarse actuator and a fine actuator. The fine actuator portion has a high bandwidth response, and can follow fast changes in tape guiding. The fine actuator is typically is used for "fine" track following, allowing the tape head to accurately follow small displacements of tape. However, the fine actuator's range of motion is limited, and it will typically not span the full dynamic range of motion required for following a data track over the full length of tape. The coarse actuator is typically used for large movement of the tape head, such as acquiring a lock on the servo signal and shifting the tape head from one set of servo tracks to another set of servo tracks. While the coarse actuator is capable of a very large stroke distance the coarse actuator has a much slower response.

The tape is typically contained in a cartridge of one or two reels, and the tape is moved between a supply reel and a take up reel. The reels typically have runout causing the tape to move laterally as the tape is moved longitudinally. Tape guides are often provided to limit the amplitude of the lateral movement of the tape so that it does not exceed the lateral movement capability of the track following servo system. However, even when tape guides are employed rapid lateral transient shifts still occur. It is appreciated that the occurrence of a lateral transient shift can be so rapid and the distances covered so great that the servo signal is no longer within the range of the fine actuator. In addition, it should be appreciated that the coarse actuator may move too slowly to obtain the servo signal within a servo lock time threshold. As a result, reading may be stopped because of an inability to track follow and writing may be stopped to prevent overwriting an adjacent track so as not to cause a readback error.

As tape moves to even higher track densities, the problem of lateral movement becomes greater, even with a guided tape path. Therefore, there is an ongoing need for improved tape positioning systems to quickly acquire lock on the servo signal and provide precise stability and tracking of the tape relative to the tape head during operation.

Figure 1:
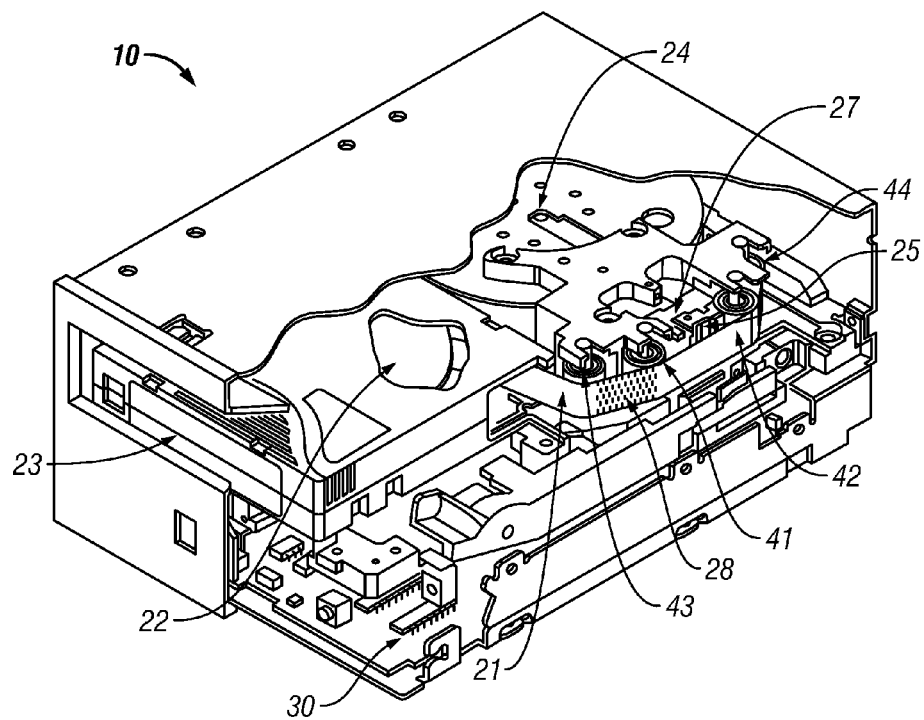
FIG. 1 illustrates a tape drive implementing a servo system in accordance with an embodiment of the invention.

FIG. 1 illustrates a tape drive 10, such as a magnetic tape drive, utilizing a servo system in accordance with one embodiment of the present description. A magnetic tape 21 is moved along a tape path from a supply reel 22 in a magnetic cartridge 23 to a take up reel 24, the reels comprising drive reels of a drive system operated by drive motors. The magnetic tape is moved along the tape path in a longitudinal direction across a tape head 25. The tape head is supported by an actuator 27 of a servo system, which, for example, may comprise a compound actuator. The tape head 25, for example, a magnetic tape head, may comprise a plurality of read and write elements and a plurality of servo read elements. The tape may comprise a plurality of servo tracks or bands 28 which are recorded on the tape in the longitudinal direction on the tape which are parallel to the data tracks. The servo read elements (not shown) are part of a track following servo system for moving the tape head 25 in a lateral direction for following lateral movement of the longitudinal tracks as the tape 21 is moved in the longitudinal direction, and thereby position the tape head 25 at the data tracks to follow the data tracks.

The compound actuator 27 has a coarse actuator (shown in FIG. 2, hereinafter 426), such as a stepper motor, and a fine actuator (shown in FIG. 2, hereinafter 420), such as a voice coil motor, mounted on the coarse actuator. In one embodiment, the fine actuator portion has a high bandwidth response, and follows fast changes in tape guiding. However, the fine actuator's range of motion is limited such that it cannot span the full dynamic range of motion required for following a data track over the full length of tape. In one embodiment the fine actuator's range of motion or (e.g. the fine actuator's travel limit) is 900 microns. In one embodiment, the coarse actuator is capable of large stroke distances and is utilized to shift the tape head over large lateral distances (e.g. over a range of 12 to 8500 microns). While the coarse actuator is capable of a very large stroke distance the coarse actuator has a much slower response than the fine actuator.

One example of a compound actuator is described in coassigned U.S. Pat. No. 5,793,573, which is incorporated herein by reference in its entirety. Those of skill in the art understand that many different types of compound actuators may be employed to implement an embodiment of the present invention.

It is appreciated that the occurrence of a lateral transient shift can be so rapid and the distances covered so great that the servo signal is no longer within the range of the fine actuator and that the coarse actuator moves too slowly to obtain the servo signal within a lock tolerance window. As a result, reading may be stopped because of an inability to track follow and writing may be stopped to prevent overwriting an adjacent track so as not to cause a readback error.

The tape drive 10 additionally comprises a servo controller 30 which provides the electronics modules and processor to implement the servo system to operate the compound actuator. The magnetic tape 21 of the present example may be provided in a tape cartridge or cassette 23 having a supply reel 22 or having both supply reel 22 and take up reel 24.

In one embodiment tape guides 41, 42, 43, 44 reduce excessive lateral movement of the tape, for example, from runout of the supply reel 22 or the take up reel 24, at least from the standpoint of the amplitude of the movement of the tape. However, when wound on a reel, tape is typically subjected to rapid lateral transient shifting, for example, from stack shifts or stagger wraps, in which one wrap of the tape is substantially offset with respect to an adjacent wrap. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape. It should be appreciated that tape 21 can be very thin with little lateral stiffness at the edge.

In one embodiment the tape guides 41, 42, 43, 44 are flangeless tape guides. While flangeless tape guides have the benefit of eliminating damage at the tape edges due to interaction with the flanges, they allow much more lateral movement of the tape. In some environments employing flangeless tape guides allows magnetic tape 21 to shift laterally 1000 microns or more in either direction. This lateral shift makes it difficult for a servo system to obtain and maintain servo signal.

Figure 2:
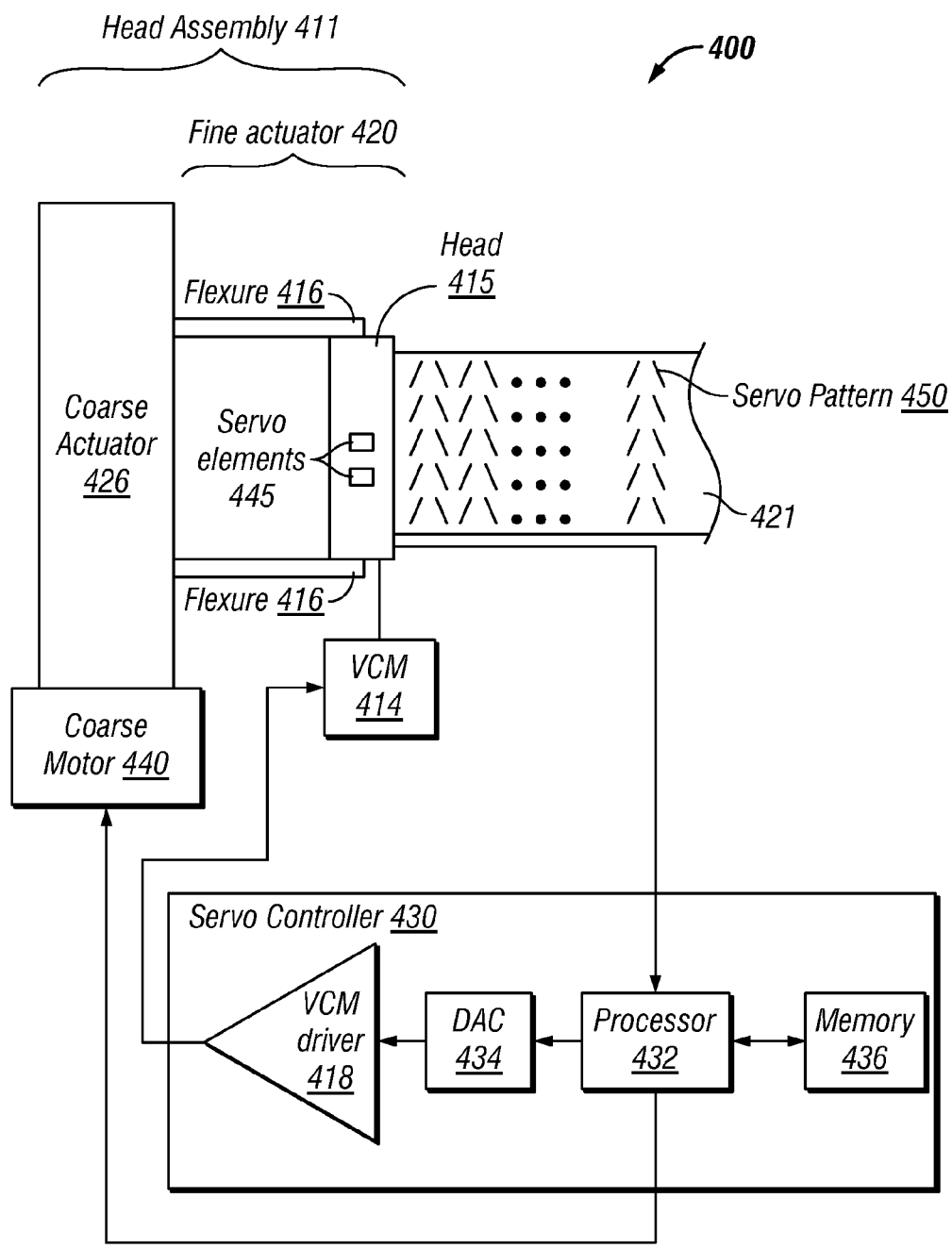
FIG. 2 illustrates a block diagram, not drawn to scale, of a tape head and servo controller in accordance with an embodiment of the invention.

FIG. 2 is a block diagram of a portion of a tape drive system 400 in accordance with the present embodiment, having a tape head assembly 411, a servo controller 430 and a coarse motor 440 in which the present invention may be implemented. Also illustrated is a representative servo pattern 450 recorded in tracks of the tape media 421. The head assembly 411 has a fine actuator 420, having a voice coil motor (VCM) 414 and a pair of flexures 416 and a tape head 415. The tape head 415 has two servo elements 445, corresponding in position with two of the servo tracks 450, and one or more read/write elements (not shown) spaced between the servo elements 445. The arrangement of elements on the head 415 in FIG. 2 is for illustrative purposes. It should be appreciated that other configuration of elements on the head are possible. For example, the invention is applicable to other configurations, having a head with a single servo element or one with more than two servo elements.

The servo controller 430 has a processor 432, a memory 436, a digital-to-analog converter (DAC) 434 and a VCM driver 418 (e.g. a fine servo driver). The processor 432 has an input to receive position signals fed back from the servo elements 445, a first output through which the coarse motor 440 is controlled, a second output through which the DAC 434 is provided with an input value, and a third output which the memory 436 is provided. In one embodiment the processor 432 has servo logic and programming instructions for acquiring servo lock and following servo pattern 450.

Memory 436 stores information and programming for the position control of the servo elements 445. In one embodiment the memory may be nonvolatile memory such as ROM, flash, magnetic computer storage devices (e.g. hard disks, floppy disks, and magnetic tapes) and optical disks. In addition, the memory may be volatile memory such as RAM, DRAM, and SRAM. Memory 436 has input to receive position information from the processor and output through which position information is feed to the processor 432. The DAC 434 has an input, coupled to receive the output from the processor 432, and an output through which the VCM driver 418 is provided with a current. The VCM driver 418 has an input, coupled to receive the DAC 434 output, and an output coupled to drive the VCM 414 of the fine actuator 420. The VCM 414, deflects flexures 416 to move the servo elements 445 small distances laterally with respect to the tape 421 length. The processor 432, the DAC 434, the driver 418, the VCM 414 and the servo elements 445 comprise the fine servo loop.

Figure 3:
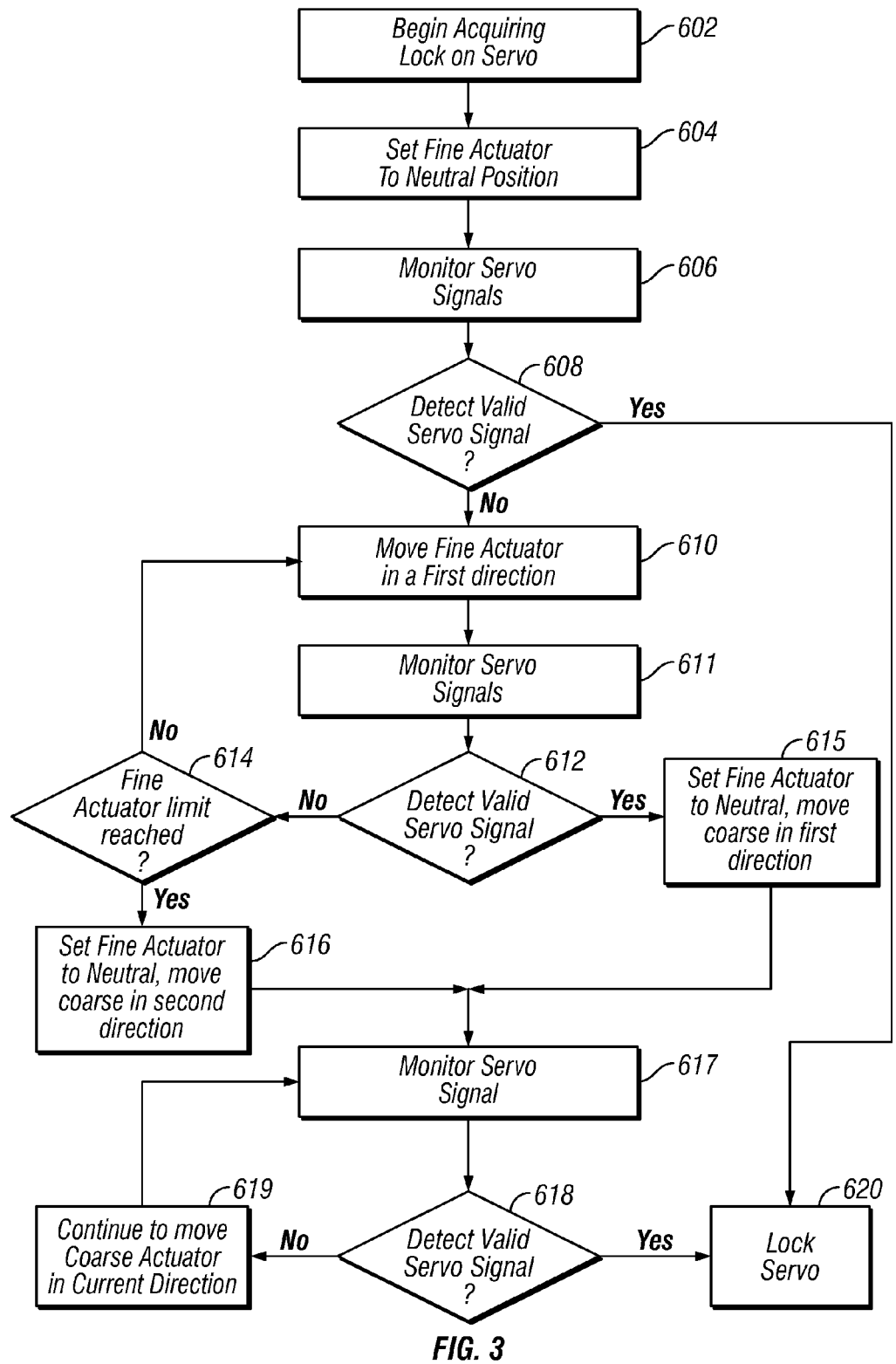
FIG. 3 is a flowchart of a method of acquiring a servo pattern according to an embodiment of the invention.

The operation of the present invention in one embodiment will now be described with reference to the flowchart of FIG. 3. In step 602 the tape drive 10 begins acquiring a lock on servo signal. In one embodiment, the tape drive 10 begins acquiring a lock on servo signal in response to a command to read and/or write to the tape media 421. In response to a command to read and/or write to the tape media 421 the tape drive 10 loads tape cartridge 23. However, in other embodiments the tape cartridge may already be loaded into tape drive 10. In step 604, the fine actuator 420 is set to a first lateral position with respect to the coarse actuator 426. In one embodiment, the first lateral position is the neutral position of the fine actuator 420 by setting the output DAC equal to 0 (Output DAC=0). In the neutral position the actuator fine actuator 420 is equidistant laterally from each end of the coarse actuator 426 and therefore can be displaced in either direction relative to the neutral position with equal capability. It should be understood by one of ordinary skill in the art that the first lateral position may be any starting position of the fine actuator with respect to the coarse actuator 426; however, the neutral position is preferred.

In step 606, the servo elements 445 begins monitoring servo signals at a first lateral position (e.g. neutral position where Output DAC=0) to detect the servo pattern 450.

In step 608 the processor 432 determines if the servo elements 445 have detected a valid servo signal. The processor 432 determines that there is a valid servo signal when the predetermined servo lock threshold is met. The predetermined servo lock threshold may be set by the user, an administrator, or may be set by the manufacturer of the tape drive. In one embodiment, the predetermined servo lock threshold is met when a servo signal is detected in more than fifty percent of the servo samples. For example, if the servo elements monitored two-hundred (200) servo samples and sensed one-hundred (100) or more servo signals within the two-hundred (200) samples then processor 432 would determine that the predetermined servo lock threshold is met, and thus, there is a valid servo signal. It should be understood by one of ordinary skill in the art that the predetermined servo lock threshold may be different for each user and for different operating conditions. For example, the predetermined servo lock threshold may be changed according to design choice, system improvements or a user's tolerance for risk. By way of example, in other embodiments, if a servo signal is detected in more than ten percent of the samples then processor 432 may determine that the predetermined servo lock threshold is met, and thus, there is a valid servo signal. Still further, if a servo signal is detected in more than 90 percent of samples then processor 432 may determine that the predetermined servo lock threshold is met, and thus, there is a valid servo signal.

If in step 608 the processor 432 determines that a valid servo signal is detected by servo elements 445 then the process flows to step 620. In step 620, once a valid servo signal is detected within the predetermined servo lock threshold, the processor 432 locks the servo system 400 to the current lateral position of the tape head servo elements 445 (step 620). The servo controller 430 performs the normal track following function of following the servo signal at the desired lateral position allowing reading and/or writing of data on the associated data tracks as understood by one of ordinary skill in the art.

However, if in step 608 the processor 432 determines that a valid servo signal is not detected, then the fine actuator 420 is moved an increment, X, in a first direction with respect to the coarse actuator 426 (step 610). When fine actuator 420 is moved an increment, X, in a first direction with respect to the coarse actuator 426, the Output DAC=DAC+Y, wherein the Y is the DAC value that moves the fine actuator 420 an increment X in the first direction. In one embodiment, increment, X, may be the distance between one servo band (e.g. 200 microns). However, it should be understood by one of ordinary skill in the art that the increment, X, may be larger or smaller than 200 microns as appropriate. Specifically, increment, X, may be determined by a servo tuning process and/or changed dynamically via drive microcode.

In step 611 the servo elements 445 monitors servo signals at the second lateral position (Output DAC=DAC+Y) of fine actuator 420 to detect servo pattern 450. For example, the servo elements 445 monitor servo signals by monitoring and receiving an analog signal pulse as the servo element 445 crosses a transition of servo pattern 450. In step 612, the processor 432 determines if the servo elements 445 detect a valid servo signal in accordance with the method described with respect to step 608.

If in step 612 the processor 432 determines that a valid servo signal is detected by servo elements 445 then the process flows to step 615. In step 615, processor 432 sends output to the DAC to move the fine actuator 420 to the first lateral position with respect to the coarse actuator 426 (e.g. the neutral position, Output DAC=0). In addition, in step 615, the processor sends output to the coarse motor 440 to move coarse actuator 426 in the first direction. The process then flows to step 617.

If in step 612 the processor 432 determines that valid servo signal is not detected by servo elements 445 the process flows to step 614.

In step 614, the processor 432 determines if the fine actuator travel limit is reached. For example, the processor 432 determines that a fine actuator travel limit is reached when the fine actuator has moved 900 microns. As discussed above, the fine actuator has a limited range of motion. If the fine actuator travel limit has not been reached the process flows back to step 610. In step 610 the fine actuator 420 is moved another increment, X, in a first direction with respect to the coarse actuator 426.

However, if it is determined that the fine actuator travel limit has been reached in step 614, then the process flows to step 616. In step 616, the processor 432 sends output to the DAC 434 to move the fine actuator 420 to the first lateral position (e.g. the neutral position, Output DAC=0). In addition, in step 616, the processor sends output to the coarse motor 440 to move coarse actuator 426 in a second direction that is opposite of the first direction. In one embodiment the coarse actuator may be moved in the second direction anywhere in the range from 12 to 1500 microns.

In step 617, the servo elements 445 monitors servo signals as the coarse motor 440 moves the coarse actuator 426 in the second direction. In step 618, the processor 432 determines if the servo elements 445 detect a valid servo signal in accordance with the method described with respect to step 608. If a valid servo signal is detected in step 618 then the process flows to step 620. In step 620 the servo is locked on the servo signal as understood by one of ordinary skill in the art.

If a valid servo signal is not detected then the coarse actuator is moved again in the current direction (step 619). The current direction can be defined as the immediate preceding fine actuator 420 direction, (e.g. the direction the fine actuator was moving in step 618). The current direction may be the first direction or the second direction. For example, if the process is flowing from step 615, in which the coarse actuator is currently moving in a first direction (see step 615), then the coarse actuator would move in the first direction in step 619. However, if the process is flowing from step 616, in which the coarse actuator is currently moving in a second direction then the coarse actuator would move in the second direction in step 619. Once the coarse actuator is moved in the current direction then the process flows back to step 617.

Steps 617, 618, and 619 are repeated, as described above, until a valid servo signal is detected in step 618. Once a valid servo signal is detected within a predetermined servo lock threshold, the processor 432 locks the servo loop to the current lateral position of the tape head servo elements 445 (step 620). The servo controller 430 performs the normal track following function of following the servo signal at the desired lateral position allowing reading/and or writing of data on the associated data tracks as understood by one of ordinary skill in the art.

While the above embodiment discusses moving the fine actuator 420 an increment, X, at finite times (e.g. in steps 610, 615, 616, and 619) throughout the process of acquiring lock on servo signal, it should be understood that the fine actuator 420 may move continuously throughout the process as the servo elements 445 monitor for servo signals. For example, fine actuator 420 moves in a first direction throughout steps 610-612 until a fine actuator limit is reached, or a valid servo signal is detected.

Similarly, while the above embodiment discusses the servo elements 445 and processor 432 monitoring for a valid servo signal at finite times (e.g. in steps 606, 612, and 618) throughout the process of acquiring lock on servo signal, it should be understood that the servo elements 445 and processor 432 may continuously monitor for a servo signal. In one embodiment the servo elements 445 and processor 432 monitor for servo signal every 15 micro seconds.

While the above embodiment describes the fine actuator moving in a direction with respect to the coarse actuator 426, it is important to note that, in one embodiment, the coarse actuator 426 moves in the same direction that fine actuator 420 moves so that reaching the limit for the fine actuator 420 can be avoided. In one embodiment the coarse actuator moves every 200 micro seconds.

The invention can take the form of an entirely hardware embodiment, or an embodiment containing both hardware and software elements to operate the magnetic tape drive 10.

Furthermore, the method of the invention can take the form of a computer program product stored on and accessible from a computer usable or computer readable medium providing program code for use by or in connection with a computer or any instruction execution system. For the purposes of this description, a computer usable or computer readable medium can be any apparatus than can contain, or store the program for use by or in connection with the instruction execution system, apparatus, or device.

The storage medium can be electronic, magnetic, optical, electromagnetic, infrared, or semiconductor system (or apparatus or device). Examples of a computer readable medium, such 436 include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor 432 coupled directly or indirectly to memory elements 436 through a system bus.

The present embodiment describes a method, system and computer program product for acquiring a lock on servo signal by leveraging the faster moving fine servo actuator 420 to determine the location of the servo pattern 450. The present embodiment overcomes the shortfalls of the prior art methods wherein the coarse actuator moved too slowly to acquire the servo signal within a servo lock time threshold, causing reading and/or writing to be stopped. In the present embodiment the fine actuator 420 is moved in a first direction until a valid servo signal is detected or the fine actuator limit is reached. If the fine actuator limit is reached, it is an indication that the servo pattern 450 is in a second direction, and accordingly, the fine actuator 420 is moved in a second direction until a valid servo signal is detected. If a valid servo signal is detected the fine actuator 420 is set to a neutral position and the coarse actuator 426 is moved in the direction the current direction (the immediate preceding fine actuator 420 direction, e.g. the direction the fine actuator was moving in step 618). As a result, lock on servo signal is acquired quickly and accurately.

The description of the present invention has been presented for purposes of illustration and description, but is not intended to be exhaustive or limited to the invention in the form disclosed. The embodiment was chosen and described in order to best explain the principles of the invention, the practical application, and to enable others of ordinary skill in the art to understand the invention for various embodiments with various modifications as are suited to the particular use contemplated. It should be appreciated that changes may be made with respect to the method discussed above, including changes to the ordering of the steps. Further, those of skill in the art will understand that differing specific component arrangements may be employed than those illustrated herein. The modifications and adaptations to those embodiments may occur to one skilled in the art without departing form the scope of the present invention as set forth in the following claims.

What is claimed is:

1. A method for detecting and acquiring a track following servo pattern of a magnetic tape utilizing a fine actuator and a coarse actuator comprising:
   setting said fine actuator to a first position with respect to said coarse actuator;
   monitoring signals of at least one servo element coupled to said fine actuator to determine if a valid servo signal is detected; and
   if no valid servo signal is detected, moving the fine actuator in a first direction with respect to said coarse actuator until one of (a) a valid servo signal is detected and (b) a fine actuator travel limit with respect to said coarse actuator has been reached.

2. The method of claim 1, further comprising in response to detecting a valid servo signal, moving said coarse actuator in said first direction and setting the fine actuator to said first position with respect to said coarse actuator.

3. The method of claim 1, further comprising in response to reaching said fine actuator travel limit with respect to said coarse actuator, setting said fine actuator to said first position and moving said coarse actuator in a second direction, opposite of said first direction.

4. The method of claim 1, wherein said first position is neutral position with respect to said coarse actuator.

5. The method of claim 1, wherein a valid servo signal is within a predetermined servo lock threshold.

6. The method of claim 5, wherein said predetermined servo lock threshold is fifty percent of servo samples.

7. The method of claim 1, wherein moving said fine actuator in said first direction comprises moving said fine actuator an increment, X.

8. The method of claim 1, further comprising in response to detecting a valid servo signal, locking on said valid servo signal and performing track following of said valid servo signal.

9. A servo system for detecting and acquiring a track following servo pattern of a magnetic tape, said servo system comprising:
   a tape head comprising a fine actuator and a coarse actuator and at least one servo element configured to monitor servo signals;
   a servo controller coupled to said tape head for positioning said tape head laterally with respect to said magnetic tape; and
   wherein said servo controller determines if a valid servo signal is detected and in response to not detecting a valid servo signal, moves said fine actuator in a first direction with respect to said coarse actuator until one of (a) a valid servo signal is detected and (b) a fine actuator travel limit with respect to said coarse actuator has been reached.

10. The servo system of claim 9, further comprising said servo controller, in response to detecting a valid servo signal, moving said coarse actuator in said first direction and setting the fine actuator to said first position with respect to said coarse actuator.

11. The servo system of claim 9, further comprising said servo controller, in response to reaching said fine actuator travel limit with respect to said coarse actuator, setting said fine actuator to said first position and moving said coarse actuator in a second direction, opposite of said first direction.

12. The servo system of claim 9, wherein said first position is neutral position with respect to said coarse actuator.

13. The servo system of claim 9, wherein a valid servo signal is within a predetermined servo lock threshold.

14. The servo system of claim 13, wherein said predetermined servo lock threshold is fifty percent of servo samples.

15. The servo system of claim 9, further comprising in response to detecting a valid servo signal, said servo controller locking on said valid servo signal and performing track following of said valid servo signal.

16. A magnetic tape storage drive comprising:
   a tape head comprising a fine actuator and a coarse actuator and at least one servo element configured to monitor servo;
   a tape drive system for moving a magnetic tape in a longitudinal direction past said tape head;
   a servo controller coupled to said tape head for positioning said tape head laterally with respect to said magnetic tape; and
   wherein said servo controller signals determine if a valid servo signal is detected and in response to not detecting a valid servo signal, moves said fine actuator in a first direction with respect to said coarse actuator until one of (a) a valid servo signal is detected and (b) a fine actuator travel limit with respect so said coarse actuator has been reached.

17. The magnetic tape storage drive of claim 16, further comprising said servo controller, in response to detecting a valid servo signal, moving said coarse actuator in said first direction and setting the fine actuator to said first position with respect to said coarse actuator.

18. The magnetic tape storage drive of claim 16, further comprising said servo controller, in response to reaching said fine actuator travel limit with respect to said coarse actuator, setting said fine actuator to said first position and moving said coarse actuator in a second direction, opposite of said first direction.

19. The magnetic tape storage drive of claim 16, wherein said first position is neutral position with respect to said coarse actuator.

20. The magnetic tape storage drive of claim 16, wherein a valid servo signal is within a predetermined servo lock threshold.

21. The magnetic tape storage drive of claim 20, wherein said predetermined servo lock threshold is fifty percent of servo samples.

22. The magnetic tape storage drive of claim 16, further comprising in response to detecting a valid servo signal, said servo controller locking on said valid servo signal and performing track following of said valid servo signal.

* * * * *